(12) United States Patent
Lee et al.

(10) Patent No.: US 12,248,131 B2
(45) Date of Patent: Mar. 11, 2025

(54) PORTABLE CONFOCAL OPTICAL SCANNING MICROSCOPIC DEVICE

(71) Applicant: SOUTHERN TAIWAN UNIVERSITY OF SCIENCE AND TECHNOLOGY, Tainan (TW)

(72) Inventors: Yu-Ching Lee, Tainan (TW); Hsiao-Ying Wu, Tainan (TW); Shi-De Chen, Tainan (TW)

(73) Assignee: SOUTHERN TAIWAN UNIVERSITY OF SCIENCE AND TECHNOLOGY, Tainan (TW)

( * ) Notice: Subject to any disclaimer, the term of this patent is extended or adjusted under 35 U.S.C. 154(b) by 528 days.

(21) Appl. No.: 17/844,759

(22) Filed: Jun. 21, 2022

(65) Prior Publication Data
US 2023/0375815 A1    Nov. 23, 2023

(30) Foreign Application Priority Data
May 19, 2022  (TW) .................................. 111118682

(51) Int. Cl.
G02B 21/00    (2006.01)

(52) U.S. Cl.
CPC ....... *G02B 21/0032* (2013.01); *G02B 21/006* (2013.01)

(58) Field of Classification Search
CPC .......................... G02B 21/0032; G02B 21/006
USPC .................................................. 359/618, 656
See application file for complete search history.

(56) References Cited

U.S. PATENT DOCUMENTS

2006/0072189 A1\* 4/2006 DiMarzio .......... G02B 21/0036
359/368

\* cited by examiner

*Primary Examiner* — William Choi

(57) ABSTRACT

A portable confocal optical scanning microscopic device includes an optical path module, a light source module, a light receiving module and an object stage, wherein the optical path module includes a beam splitter and a focusing lens; the light source module includes a light generator for generating an incident light and can be injected into the beam splitter; the light receiving module includes a spatial filter; the object stage is for setting a test specimen. The optical path module, the light source module, the light receiving module, and the object stage can be disassembled and assembled on the operating board to flexibly configure an adaptive combination capable of performing the optical scanning.

12 Claims, 6 Drawing Sheets

PORTABLE CONFOCAL OPTICAL SCANNING MICROSCOPIC DEVICE

CROSS-REFERENCE TO RELATED APPLICATION

This non-provisional application claims priority under 35 U.S.C. § 119(a) on Patent Application No(s). 111118682 filed in Taiwan, R.O.C. on May 19, 2022, the entire contents of which are hereby incorporated by reference.

BACKGROUND OF THE INVENTION

1. Field of the Invention

The present disclosure relates to a confocal optical scanning microscopic device, and in particular to a portable confocal optical scanning microscopic device.

2. Description of the Related Art

Confocal microscopic instruments are widely used because of their high resolution and contrast, especially in biotechnology.

In order to be able to obtain a clear image of the tiny object to be measured, the traditional confocal microscopic instrument needs to set a plurality of precise optical components in the housing of the instrument, and can provide enough setting space so that the plurality of optical components can be accurately focused, but the instrument itself is not modularized and cannot be disassembled and assembled, so the overall volume of the instrument is large and bulky, resulting in the trouble of the user that it is not easy to carry; further, the configuration of the plurality of optical components in the instrument is fixed, the configuration between the optical components cannot be changed in response to the demand (e.g., change the orientation between the optical components), nor can it adjust the number of optical components in response to the demand, such as increasing the number of optical components to expand.

Therefore, it is the main focus of the present disclosure to know how to solve the above-described problem that the traditional confocal microscopic instrument is not easy to carry.

BRIEF SUMMARY OF THE INVENTION

The inventor felt that the traditional confocal microscopic instrument was not perfect, and exhausted his mind to research carefully, and then developed a portable confocal optical scanning microscopic device, which is modular and may be disassembled and assembled on an operating board for easy portability.

The portable confocal optical scanning microscopic device provided by the disclosure can be modularized to be assembled and disposed on an operating board to perform optical scanning to a test specimen to obtain an image, the device comprises an optical path module, a light source module, a light receiving module and an object stage. The optical path module comprises a beam splitter and a focusing lens, the beam splitter has a light incident side, a reflective side and a light outlet side, and the focusing lens is located at the reflective side of the beam splitter; the light source module comprises a light generator, the light generator is for generating an incident light to be injected into the beam splitter from the light incident side along a first axis; the light receiving module comprises a spatial filter; the object stage is for setting the test specimen, the object stage is located at a side of the beam splitter opposite to the focusing lens. The optical scanning is that the incident light is injected into the beam splitter, and penetrated the focusing lens, and then shot to the test specimen, so that the incident light generates a reflected light on the test specimen, after the reflected light is shot back to the beam splitter from the reflective side, the reflected light is shifted to the light outlet side, the reflected light is then shot to the spatial filter to filter the reflected light that is not focused on the test specimen. The optical path module, the light source module, the light receiving module, and the object stage can be disassembled and assembled on the operating board to flexibly configure an adaptive combination capable of performing the optical scanning.

Accordingly, the portable confocal optical scanning microscopic device of the present disclosure modularizes the related optical components performing the optical scanning, and can be assembled on the operating board again when used, and can be assembled and used on different operating boards, and can be disassembled from the operating board after use, thereby achieving the effect of easy to carry. Further, after the optical components are modularized, the configuration between the modules can be adjusted according to the status of the operating board on the spot, and can be expanded through the modularization of the optical components, so as to achieve the effect of convenience in operation and use.

DETAILED DESCRIPTION OF THE INVENTION

Figure 1:
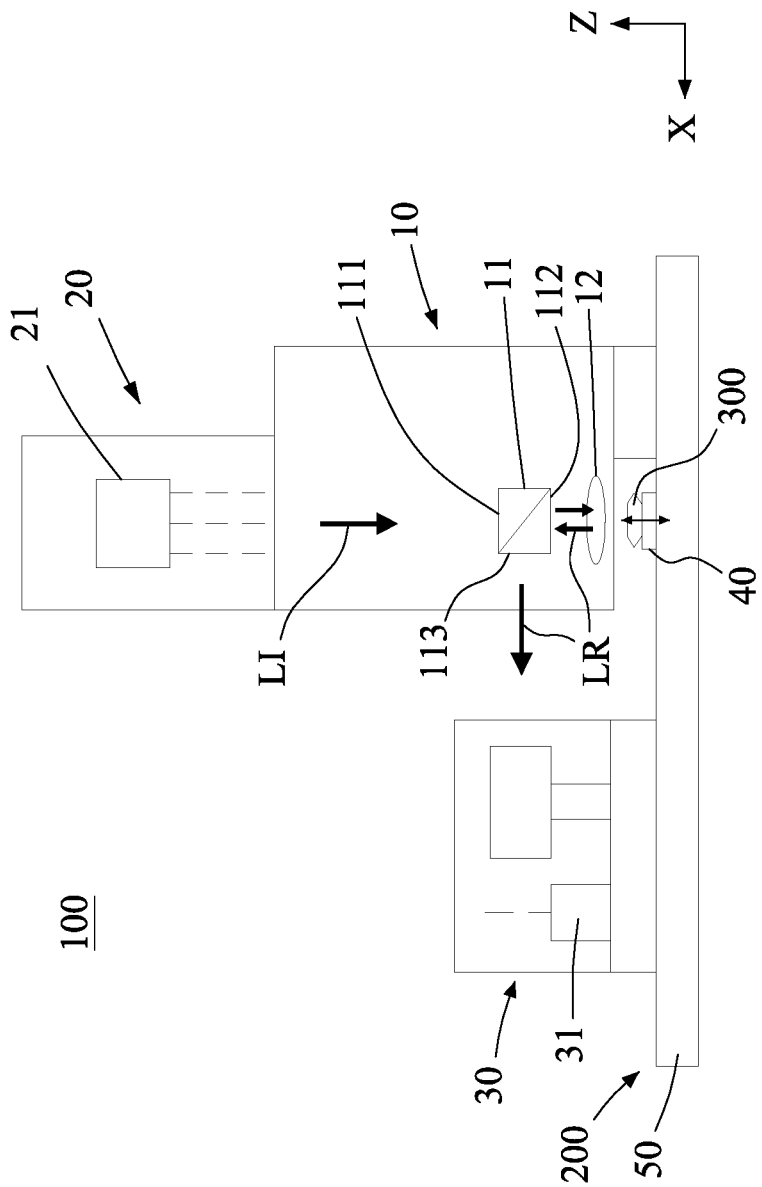
FIG. 1 is a schematic block diagram of an embodiment of the present disclosure.

To facilitate understanding of the object, characteristics and effects of this present disclosure, embodiments together with the attached drawings for the detailed description of the present disclosure are provided.

Referring to FIGS. 1 to 6, the present disclosure provides a portable confocal optical scanning microscopic device 100, which can be modularized and assembled and disposed on an operating board 200 to optically scan a test specimen 300 to obtain an image.

The portable confocal optical scanning microscopic device 100 comprises an optical path module 10, a light source module 20, a light receiving module 30 and an object stage 40, wherein:

The optical path module 10 comprises a beam splitter 11 and a focusing lens 12, may also include a reflector 13. Among them, the beam splitter 11 has a light incident side 111, a reflective side 112 and a light outlet side 113, and the focusing lens 12 is located at the reflective side 112 of the beam splitter 11, the reflector 13 can be optionally set.

The light source module 20 comprises a light generator 21, the light generator 21 is for generating an incident light LI to be injected into the beam splitter 11 from the light incident side 111 along a first axis Z. The light generator 21 may be a laser light generator, and the incident light LI is a laser light, but the present disclosure is not limited to this example, all the light generators having a light source capable of equivalent substitution (e.g., mercury lamp) fall within the scope intended to be protected by the present disclosure.

The light receiving module 30 comprises a spatial filter 31. The light receiving module 30 may include an optical power meter (not shown in the drawing), which may be located after the spatial filter 31, for measuring optical power.

The object stage 40 is for setting the test specimen 300, the object stage 40 is located at a side of the beam splitter 11 opposite to the focusing lens 12. The object stage 40 may have a variety of sizes, can be selected and replaced depending on the size of the test specimen 300.

The optical scanning is that the incident light LI is injected into the beam splitter 11, and penetrated the focusing lens 12, and then shot to the test specimen 300, so that the incident light LI generates a reflected light LR on the test specimen 300, after the reflected light LR is shot back to the beam splitter 11 from the reflective side 112, the reflected light LR is shifted from the beam splitter 11 to the light outlet side 113, the reflected light LR at this time is then shot to the spatial filter 31, the reflected light LR that is not focused on the test specimen 300 is filtered by the spatial filter 31, that is, the reflected light LR that is focused on the test specimen 300 is only allowed to pass through to remove the scattered light of the non-focal plane, so that the image of the test specimen 300 can be clearly imaged.

The optical path module 10, the light source module 20, the light receiving module 30, and the object stage 40 can each be disassembled and assembled on the operating board 200 to flexibly configure an adaptive combination capable of performing the optical scanning.

In one embodiment, as shown in FIG. 1, the position of the light source module 20 relative to the optical path module 10 is that the light generator 21 is disposed at the light incident side 111 of the beam splitter 11, and the light generator 21 and the focusing lens 12 are in positions parallel to the optical axis for the incident light LI generated by the light generator 21 to aim at the light incident side 111 and directly shoot into the beam splitter 11. In the embodiment, the position of the light receiving module 30 relative to the optical path module 10 is that the spatial filter 31 is disposed at the light outlet side 113 of the beam splitter 11, and the spatial filter 31 and the focusing lens 12 are in positions perpendicular to the optical axis.

Figure 2:
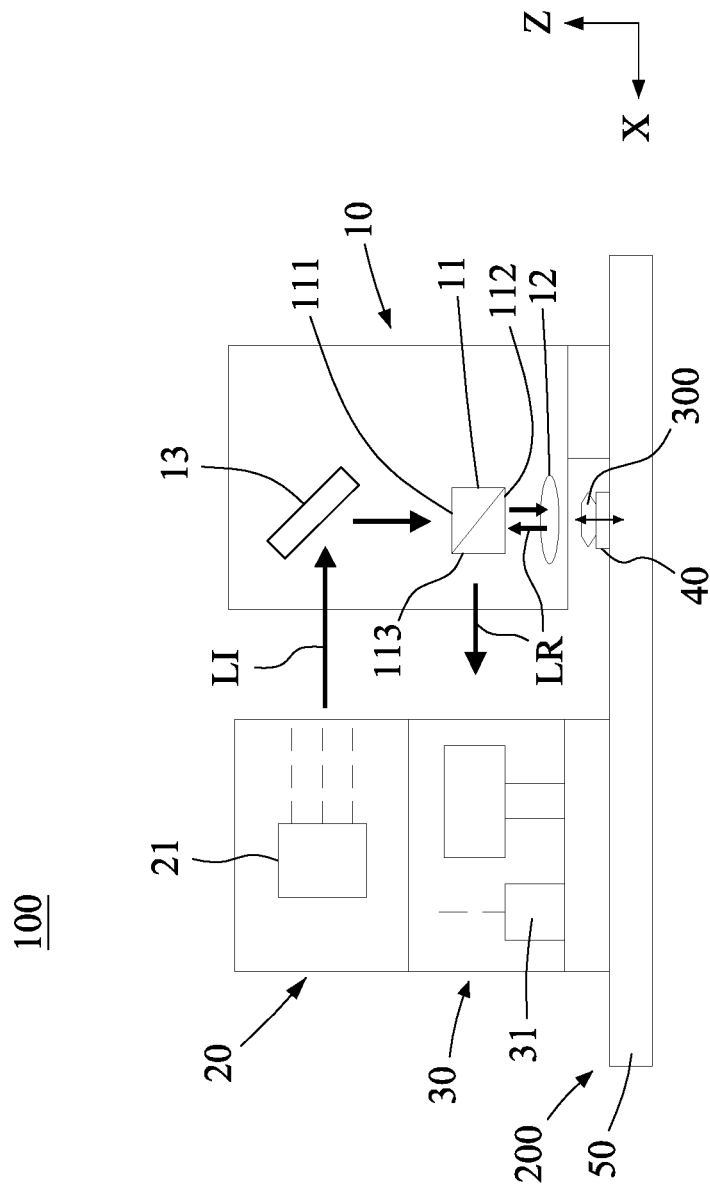
FIG. 2 is a schematic block diagram of FIG. 1 adding with a reflector.

In another embodiment, as shown in FIG. 2, when the reflector 13 is selected, the reflector 13 is set in the midway of the incident light LI shooting into the light incident side 111, at this time the position of the light source module 20 relative to the optical path module 10 is replaced to a place that the light generator 21 is located next to the reflector 13, and is located at the same side of the light receiving module 30, and the light generator 21 and the focusing lens 12 at this time are perpendicular to the optical axis for the incident light LI to shoot at the reflector 13 and then shoot into the beam splitter 11 through the reflection.

Figure 3:
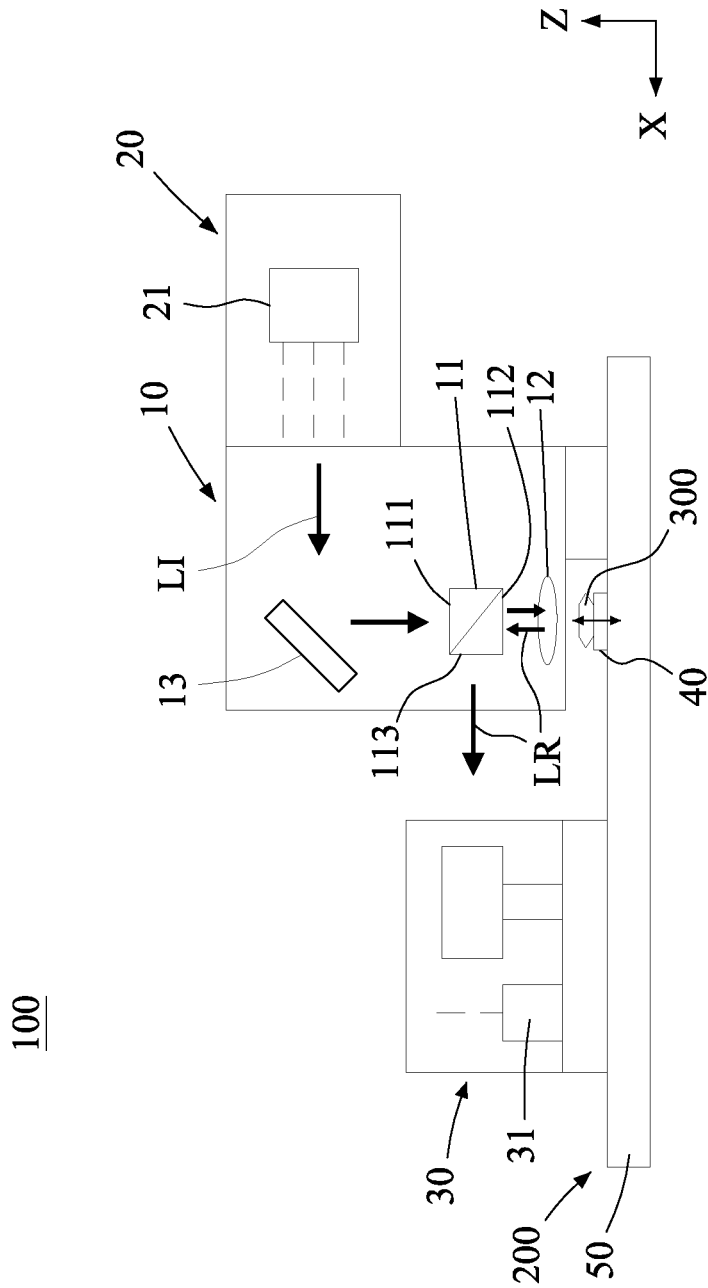
FIG. 3 is a schematic block diagram of the light source module of FIG. 2 changing position.

Alternatively, the position of the light source module 20 relative to the optical path module 10 may also be replaced to a place that the light generator 21 and the light receiving module 30 are located at two opposite sides of the optical path module 10 (as shown in FIG. 3), the light generator 21 and the focusing lens 12 at this time are also perpendicular to the optical axis for the incident light LI to shoot at the reflector 13 and then shoot into the beam splitter 11 through the reflection.

In the embodiment, a position of the light receiving module 30 relative to the optical path module 10 is also that the spatial filter 31 is disposed at the light outlet side 113 of the beam splitter 11, and the spatial filter 31 and the focusing lens 12 are in positions perpendicular to the optical axis.

Figure 4:
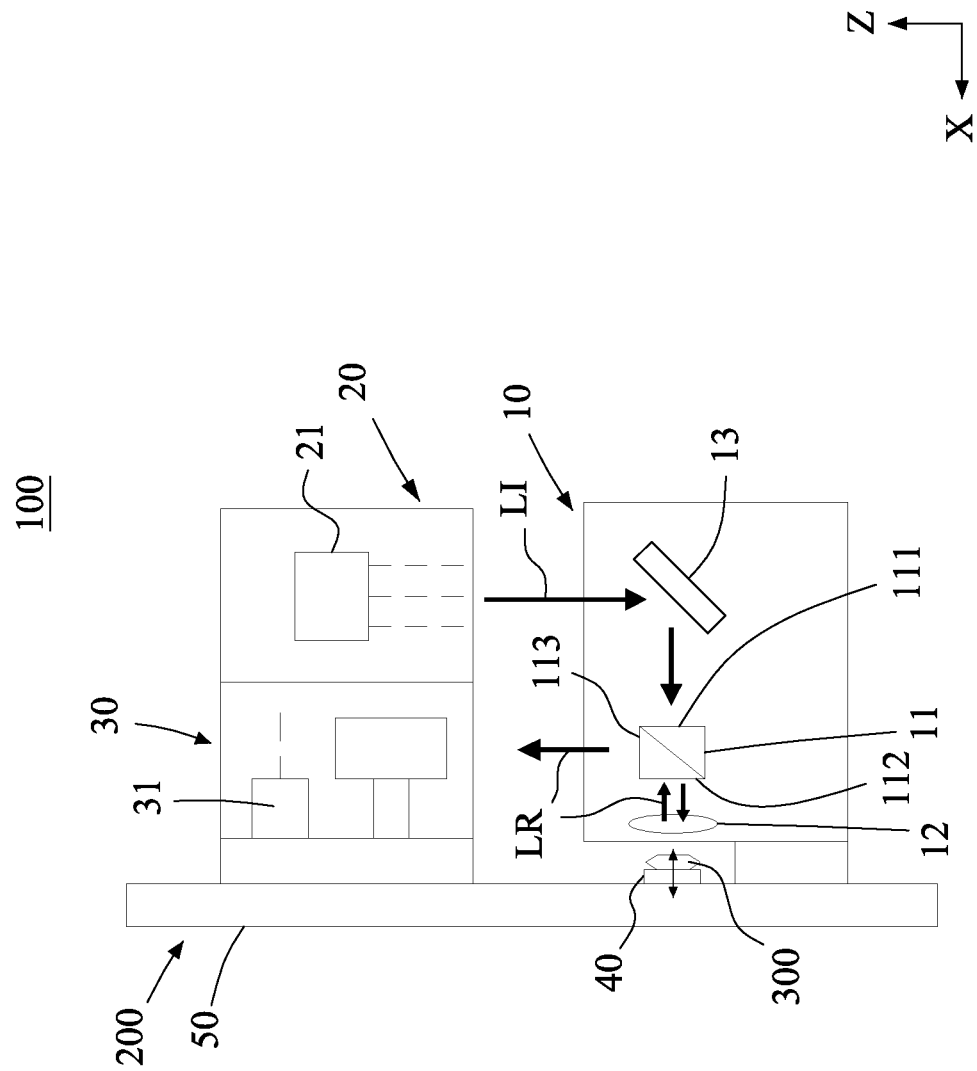
FIG. 4 is a schematic block diagram of all modules of FIG. 2 changing positions in response to that the operating board is upright.
Figure 5:
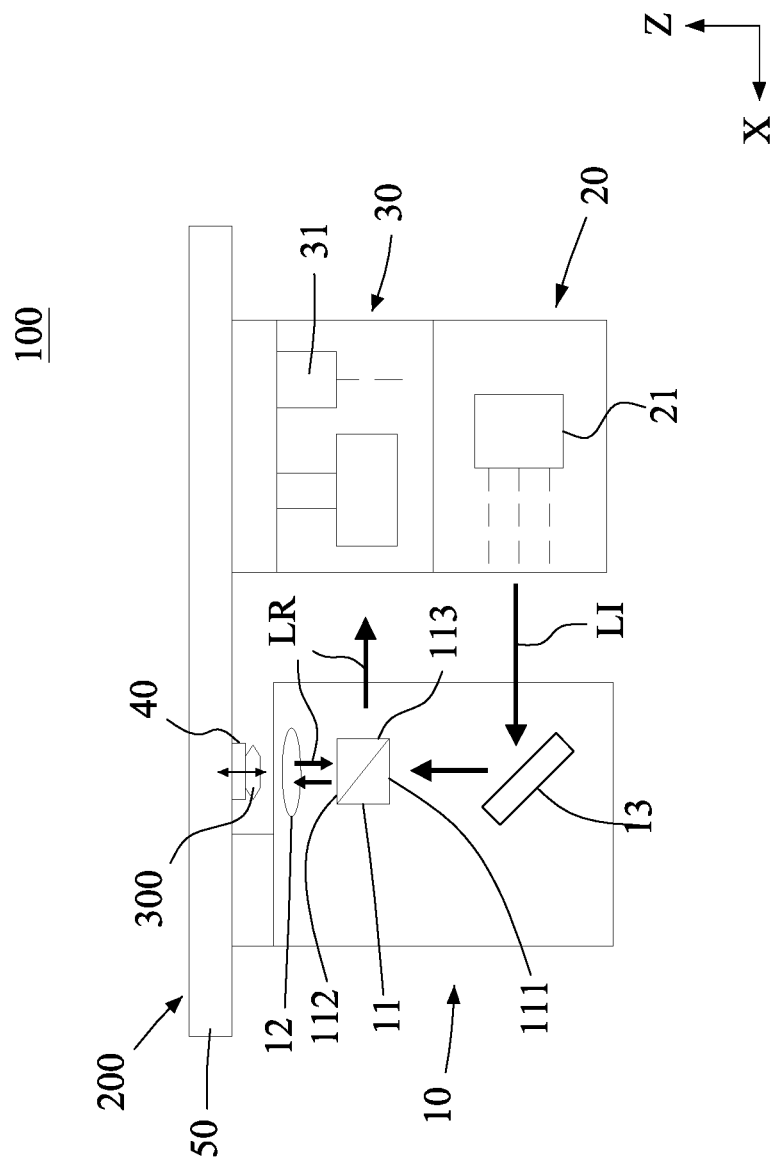
FIG. 5 is a schematic block diagram of all modules of FIG. 2 changing positions in response to that the operating board is inverted.

In different embodiments, as shown in FIG. 4, when the operating board 200 is in an upright state, the optical path module 10, the light source module 20, the light receiving module 30 and the object stage 40 may be installed corresponding to the operating board 200 in an upright state; further, as shown in FIG. 5, when the operating board 200 is in inverted state, the optical path module 10, the light source module 20, the light receiving module 30 and the object stage 40 may also be installed corresponding to the operating table 200 in the inverted state, and the above optical scanning can be achieved in different directions.

Figure 6:
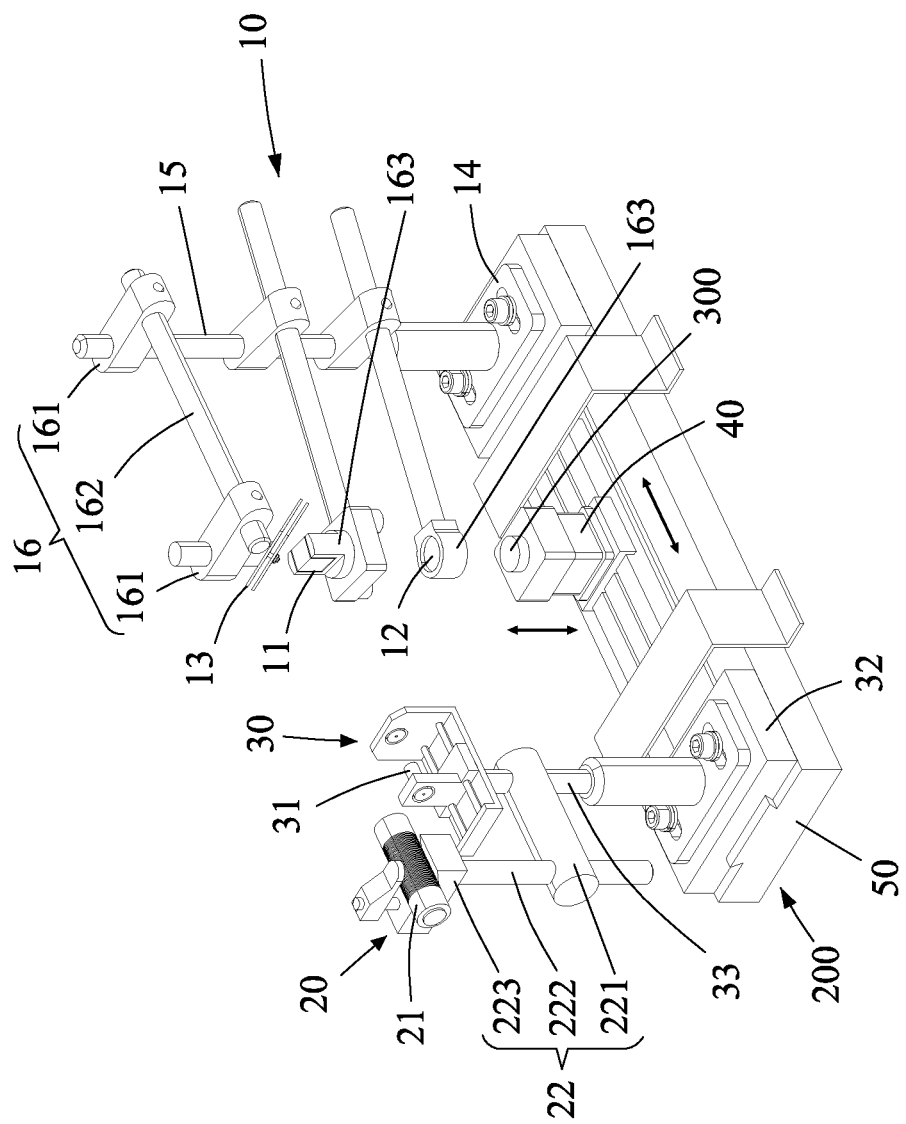
FIG. 6 is a schematic structural view of the assembly state according to the embodiment of the present disclosure.

Referring to FIG. 6 together, the assembly structure of the portable confocal optical scanning microscopic device 100 of the present disclosure and the installation on the operating board 200 are further illustrated as follows:

The optical path module 10 includes a first slide table 14, a first column 15 and three first adjustment components 16, the first column 15 stands on the first slide table 14, the three first adjustment components 16 are movably disposed on the first column 15, the beam splitter 11 is disposed at the first adjustment component 16 located in the middle, the focusing lens 12 is disposed at the first adjustment component 16 located below, and the reflector 13 is disposed at the first adjustment component 16 located above, the three adjustment components 16 can be moved along the length direction of the first column 15 to adjust a relative position of the beam splitter 11, the focusing lens 12 and the reflector 13.

Continuously, each the first adjustment component 16 may include a first clamping block 161, a first telescopic rod 162 and a first positioning seat 163, the first clamping block 161 is disposed at the first column 15 and can be fixed after the movement, the first telescopic rod 162 extends through the first clamping block 161 and can also be fixed after the movement, and the first positioning seat 163 is located at one end of the first telescopic rod 162, the beam splitter 11, the focusing lens 12 and the reflector 13 are disposed at each the first positioning seat 163 in the corresponding position. Preferably, the reflector 13 is a multi-degree-of-freedom reflector, the first adjustment component 16 provided with the reflector 13 has the first positioning seat 163 that is movable and angle-adjustable.

The light receiving module 30 may include a second slide table 32 and a second column 33, the second column 33 is disposed on the second slide table 32, the spatial filter 31 is disposed at an end of the second column 33 away from the second slide table 32. The light source module 20 includes a second adjustment component 22, the second adjustment component 22 is movably disposed on the second column 33, the light generator 21 may be disposed on the second adjustment component 22, the second adjustment component 22 can adjust a relative position of the light generator 21 and the spatial filter 31.

The second adjustment component 22 in the above embodiment comprises a second clamping block 221, a second telescopic rod 222 and a second positioning seat 223, the second clamping block 221 is disposed at the second column 33 and can be fixed after the movement,, the second telescopic rod 222 is extended through the second clamping block 221 and can be fixed after the movement, and the second positioning seat 223 is located at one end of the second telescopic rod 222, the light generator 21 is disposed on the second positioning seat 223.

The operating board 200 comprises a skid rail seat 50, the optical path module 10 and the light receiving module 30 can be respectively disassembled and assembled on the skid rail seat 50, and the optical path module 10 and the light receiving module 30 are able to slide linearly on the skid rail seat 50, thereby enabling to adjust a relative position between the optical path module 10, the light receiving module 30 and the light source module 20. The linear sliding between the optical path module 10 and the light receiving module 30 and the skid rail seat 50, for example, a dovetail sliding structure as shown in FIG. 6, but the present disclosure is not limited to thereto, may also be set by a linear skid rail and a slide seat, or the replacement that is equivalent.

In the embodiment of the above, the object stage 40 is fixed after assembling and disposing on the skid rail seat 50, the skid rail seat 50 can be drivingly connected by a drive member (not shown in the drawing), so that the drive member drives the object stage 40 to move in an one-dimensional direction along a second axis X that is perpendicular to the first axis Z (planar space), the movement is not limited to one-dimensional direction, may also be a two-dimensional direction (cubical space), and the drive member, for example, is a servo motor, which and the skid rail seat 50 can be connected through the lead screw and screw base (not shown in the drawing). Further, the object stage 40 itself may be connected to an actuator (not shown in the drawing), the object stage 40 can be driven by the actuator and moved along the first axis Z, so that the test specimen 300 is close to or away from the focusing lens 12, in order to achieve the focus action of the test specimen 300, but the present disclosure is not limited to that the object stage 40 is driven by the actuator and moves along the first axis Z to focus, the actuator may also be corresponding to the focusing lens 12 and set in the optical path module 10 to drive the focusing lens 12 to move along the first axis Z, the focus action can also be achieved. The actuator, for example, is a motor or linear electric cylinder.

In the above example, although the light source module 20 and the light receiving module 30 are disposed on the second slide table 32, in different embodiments, the light source module 20 and the light receiving module 30 may also be disposed on their own independent slide table (not shown in the drawing); similarly, although the optical path module 10 and the light receiving module 30 are respectively disposed on the first slide table 14 and the second slide table 32, in different embodiments, the optical path module 10 and the light receiving module 30 may also be disposed on the same slide table (not shown in the drawing). In other words, as to the portable confocal optical scanning microscopic device 100 of the present disclosure, all the optical path module 10, the light source module 20 and the light receiving module 30 are in a modular design and disassembled and assembled to change position that fall within the scope intended to be protected by the present disclosure.

Further, in different embodiments, the optical path module 10, the light source module 20, the light receiving module 30 and the object stage 40 are not limited to a set as shown in each figure that is disposed on one skid rail seat 50, may also be a plurality of sets by a combination of the optical path module 10, the light source module 20, the light receiving module 30 and the object stage 40 (e.g., shown in FIG. 2), going with a plurality of skid rail seats 50 to expand side by side (not shown in drawing), so that the same test specimen 300 is performed array image measurement, for example, the measurement of surface topography and roughness.

It is not difficult to find that the feature of the present disclosure is in that the portable confocal optical scanning microscopic device 100 of the present disclosure modularizes the related optical components performing the above optical scanning, and the optical path module 10, the light source module 20 and the light receiving module 30 go with the setting of the object stage 40, as long as there is an environment of the operating board 200, they can be assembled and used on the operating board 200, the use herein refers to the ability to assemble and use on different operating boards 200, and can be disassembled from the operating board 200 after use, thereby achieving the effect of easy to carry.

Furthermore, after the above-mentioned related optical components are modularized, the configuration between the optical path module 10, the light source module 20 and the light receiving module 30 and other modules can be adjusted according to the status of the operating board 200 on the spot, such as the adjustment of the setting orientation, and can be expanded through the modularization of the optical components, so as to achieve the effect of convenience in operation and use.

While the present disclosure has been described by means of preferable embodiments, those skilled in the art should understand the above description is merely embodiments of the disclosure, and it should not be considered to limit the scope of the disclosure. It should be noted that all changes and substitutions which come within the meaning and range of equivalency of the embodiments are intended to be embraced in the scope of the disclosure. Therefore, the scope of the disclosure is defined by the claims.

What is claimed is:

1. A portable confocal optical scanning microscopic device, which can be modularized to be assembled and disposed on an operating board to perform optical scanning to a test specimen to obtain an image, the device comprising:
   an optical path module, comprising a beam splitter and a focusing lens, the beam splitter has a light incident side, a reflective side and a light outlet side, and the focusing lens is located at the reflective side of the beam splitter;
   a light source module, comprising a light generator, the light generator is for generating an incident light to be injected into the beam splitter from the light incident side along a first axis;
   a light receiving module, comprising a spatial filter; and
   an object stage, for setting the test specimen, the object stage is located at a side of the beam splitter opposite to the focusing lens;
   the optical scanning is that the incident light is injected into the beam splitter, and penetrated the focusing lens, and then shot to the test specimen, so that the incident light generates a reflected light on the test specimen, after the reflected light is shot back to the beam splitter from the reflective side, the reflected light is shifted to the light outlet side, the reflected light is then shot to the spatial filter to filter the reflected light that is not focused on the test specimen; wherein the optical path module, the light source module, the light receiving module, and the object stage can be disassembled and assembled on the operating board to flexibly configure an adaptive combination capable of performing the optical scanning.

2. The portable confocal optical scanning microscopic device according to claim 1, wherein the optical path module further includes a reflector, the reflector is selected to be set in the midway of the incident light shooting into the light incident side, at this time the position of the light source module relative to the optical path module is replaced to a place that the light generator is located next to the reflector, and the light generator and the focusing lens are perpendicular to the optical axis for the incident light to shoot at the reflector and then shoot into the beam splitter through the reflection.

3. The portable confocal optical scanning microscopic device according to claim 2, wherein the position of the light source module relative to the optical path module is that the light generator is disposed at the light incident side of the beam splitter, and the light generator and the focusing lens are in positions parallel to the optical axis for the incident light generated by the light generator to aim at the light incident side and directly shoot into the beam splitter.

4. The portable confocal optical scanning microscopic device according to claim 2, wherein a position of the light receiving module relative to the optical path module is that the spatial filter is disposed at the light outlet side of the beam splitter, and the spatial filter and the focusing lens are in positions perpendicular to the optical axis.

5. The portable confocal optical scanning microscopic device according to claim 1, wherein the position of the light source module relative to the optical path module is that the light generator is disposed at the light incident side of the beam splitter, and the light generator and the focusing lens are in positions parallel to the optical axis for the incident light generated by the light generator to aim at the light incident side and directly shoot into the beam splitter.

6. The portable confocal optical scanning microscopic device according to claim 1, wherein a position of the light receiving module relative to the optical path module is that the spatial filter is disposed at the light outlet side of the beam splitter, and the spatial filter and the focusing lens are in positions perpendicular to the optical axis.

7. The portable confocal optical scanning microscopic device according to claim 1, wherein the object stage is connected to an actuator, the object stage can be driven by the actuator and move the test specimen close to or away from the focusing lens along the first axis.

8. The portable confocal optical scanning microscopic device according to claim 1, wherein the operating board comprises a skid rail seat, the optical path module and the light receiving module can be respectively disassembled and assembled and slide linearly on the skid rail seat, thereby enabling to adjust a relative position between the optical path module, the light receiving module and the light source module.

9. The portable confocal optical scanning microscopic device according to claim 8, wherein the optical path module includes a first slide table, a first column and a plurality of first adjustment components, the first column stands on the first slide table, the plurality of first adjustment components are movably disposed on the first column, the beam splitter, the focusing lens and the reflector are respectively disposed at one of the first adjustment components, the plurality of adjustment components can be moved along the length direction of the first column to adjust a relative position of the beam splitter, the focusing lens and the reflector.

10. The portable confocal optical scanning microscopic device according to claim 9, wherein the light receiving module includes a second slide table and a second column, the second column is disposed on the second slide table, the spatial filter is disposed at an end of the second column away from the second slide table.

11. The portable confocal optical scanning microscopic device according to claim 10, wherein the light source module includes a second adjustment component, the second adjustment component is movably disposed on the second column, the light generator is disposed on the second adjustment component, the second adjustment component can adjust a relative position of the light generator and the spatial filter.

12. The portable confocal optical scanning microscopic device according to claim 8, wherein the object stage is fixed after assembling and disposing on the skid rail seat, a drive member is used to drivingly connect the skid rail seat, so that the drive member drives the object stage to move in an one-dimensional direction or a two-dimensional direction along a second axis that is perpendicular to the first axis.

* * * * *